United States Patent [19]
LaCrosse

[11] Patent Number: 5,178,755
[45] Date of Patent: Jan. 12, 1993

[54] UV-ENHANCED OZONE WASTEWATER TREATMENT SYSTEM

[75] Inventor: Gaylen R. LaCrosse, Brussels, Wis.

[73] Assignee: ESTR Inc., Brussels, Wis.

[21] Appl. No.: 839,111

[22] Filed: Feb. 20, 1992

[51] Int. Cl.$^5$ .............................................. C02F 1/78
[52] U.S. Cl. .................... 210/195.1; 210/196; 210/202; 210/259; 210/748; 210/760; 210/804
[58] Field of Search ..................... 210/195.1, 804, 196, 210/202, 259, 760, 748, 192

[56] References Cited

U.S. PATENT DOCUMENTS

| | | | |
|---|---|---|---|
| 3,825,494 | 7/1974 | Call et al. | 210/138 |
| 3,836,781 | 9/1974 | Ellison | 250/432 |
| 3,855,124 | 12/1974 | Lapidot | 210/202 |
| 3,859,215 | 1/1975 | Milne | 210/195.3 |
| 3,945,918 | 3/1976 | Kirk | 210/44 |
| 4,028,246 | 6/1977 | Lund et al. | 210/151 |
| 4,029,578 | 7/1977 | Turk | 210/63 |
| 4,053,399 | 10/1977 | Donnelly et al. | 210/44 |
| 4,141,830 | 2/1979 | Last | 210/63 |
| 4,273,660 | 6/1981 | Beitzel | 210/760 |
| 4,374,027 | 2/1983 | Severeid et al. | 210/608 |
| 4,687,574 | 8/1987 | Hellman | 210/151 |
| 4,956,080 | 9/1990 | Josefik | 210/109 |
| 4,959,142 | 9/1990 | Dempo | 210/167 |
| 5,043,079 | 8/1991 | Hallett | 210/760 |

OTHER PUBLICATIONS

"Micronizer/300 GPM", Microlift Systems, Incorporated, Sturgeon Bay, Wis.

"If Not Us, Who? If Not Now, When?", Envirozone Technologies, Inc., Clovis, Calif.

"Mazzei Injectors Make the Best Ozone Systems . . . Better", Massei Injector Corporation, Bakersfield, Calif.

U.S. patent application Ser. No. 07/599,024, filed Oct. 17, 1990, titled: Apparatus for Removal of Solid, Chemical and Bacterial Waste from Water, Charles Hinson and Gaylen R. LaCrosse, applicants.

Primary Examiner—Stanley S. Silverman
Assistant Examiner—Cynthia L. Nessler
Attorney, Agent, or Firm—Lathrop & Clark

[57] ABSTRACT

Ozonated liquid is mixed within a multi-stage clarifier system with wastewater to be treated and suspended solids are removed. The clarified effluent is filtered and exposed to ultraviolet radiation. Ozone is injected into the irradiated effluent and received within a contact tower where reaction between the contaminants and ozone takes place. The ultraviolet irradiated, ozonated, and clarified liquid is recirculated through an ozone injector and discharged through a mixer plate into a purge chamber. The purge chamber effluent is split, with a portion returning to the contact tower and passing through a second ultraviolet radiation source, and the remaining purge chamber effluent being distributed within the clarifiers. After a predetermined residence within the system, a diverter valve in the return line is operable to discharge the treated water through a carbon filter and out of the system. The recirculation of the UV irradiated ozonated liquid provides both effective solids removal and reaction of the contaminants with the ozone to produce an acceptable treated water.

25 Claims, 5 Drawing Sheets

UV-ENHANCED OZONE WASTEWATER TREATMENT SYSTEM

FIELD OF THE INVENTION

The present invention relates to apparatus for treating contaminated liquids in general and to systems for rendering wastewater suitable for disposal in particular.

BACKGROUND OF THE INVENTION

With increased attention and regulatory resources being directed to the establishment and maintenance of uncontaminated rivers, lakes, and groundwater, it has become imperative for the producer of wastewater to employ a treatment system which avoids the introduction of prohibited levels of contaminants into the surroundings.

In many states groundwater control regulations of exacting strictness have been enacted. Commonly, these regulations require the immediate report of and remediation of any discharges of organic and inorganic wastes, soluble heavy metals, petroleum products, or bacteriologically contaminated materials, which exceed regulatory levels. Although it is always an option to transport the contaminated wastewater to an off-site authorized disposal facility, such transportation is in most circumstances prohibitively expensive due to the large volume of wastewater involved. Furthermore, transportation of wastes deemed "hazardous" may require prior authorization and permitting from regulatory authorities. Rural, residential and agribusiness sources of wastewater are particularly in need of effective treatment systems. Wastewater generators which are not connected with City sewage must independently arrange for disposal of wastewater. For individual and small business wastewater producers, it is essential that the wastewater treatment system be compact and low cost to operate.

Wastewater may contain human wastes, cooking wastes including grease and animal matter, petroleum products, pesticides, lead based paints, and any number of other wastes which are typically associated with water through common cleaning and waste disposal processes. These wastes are typically high in their biochemical oxygen demand (BOD), and their suspended solids (SS) levels.

Known systems have introduced oxidants, in particular ozone, into wastewater. This ozone injection causes inorganic contaminants to oxidize to less soluble oxides and converts organic components to carbonaceous residues and carbon dioxide. Known apparatus has utilized ozone injectors and other equipment involving pressure and velocity changes of wastewater streams to introduce the ozone in the form of a vast quantity of microscopic bubbles. The ozone bubbles tend to form about suspended solid particles and float those particles to the surface of a body of liquid. Clarifiers have been conventionally used which collect the floated solids from the water surface and separate the solids from the wastewater. To achieve higher levels of contaminant removal, wastewater systems have been employed which recirculate all or a portion of the treated wastewater through repeated cycles of ozone injection and clarification.

It has long been known that bacterial impurities may be eliminated by exposure to ultraviolet radiation. Ultraviolet light sources adapted for in-line use within fluid treatment systems are readily available. These UV sources are positioned within the system to expose the effluent prior to its exit from the system. Common ozone generators utilize an electric arc. Thus ozone generation presents significant demands for electric power and hence increases the cost of wastewater treatment.

What is needed is a wastewater treatment system which may be economically employed by small to medium users, and which effectively eliminates objectionable quantities of contaminants from wastewater such that system effluents may be freely disposed of.

SUMMARY OF THE INVENTION

The wastewater treatment system of the present invention injects ozone into a recirculating stream of wastewater which passes through a multistage clarifier to separate out suspended solids. Prior to the entry of the clarified effluent into a contact tower for fixed term exposure of the contaminants contained therein with ozone, the effluent is exposed to ultraviolet (UV) radiation. This UV radiation, in addition to reducing bacterial levels, generates OH radicals, which enhance the effectiveness of the ozone in reacting with the undesirable components of the wastewater. The ozonated, UV-irradiated, effluent is recirculated through the system for additional ozone injection and UV irradiation and to be comingled with influent wastewater in the clarifiers. A diverter valve allows recirculating fluid to be returned to the contact tower or diverted to a carbon media filter prior to discharge from the system after a desired residence time within the system.

It is an object of the present invention to provide a wastewater treatment system which effectively removes suspended solids and reduces the B.O.D levels.

It is also an object of the present invention to provide a compact wastewater treatment system which may be easily transported.

It is a further object of the present invention to provide a wastewater treatment system which is economical to operate.

Further objects, features and advantages of the present invention will be apparent from the following detailed description when taken in conjunction with the accompanying drawings.

DESCRIPTION OF THE PREFERRED EMBODIMENT

Figure 1:
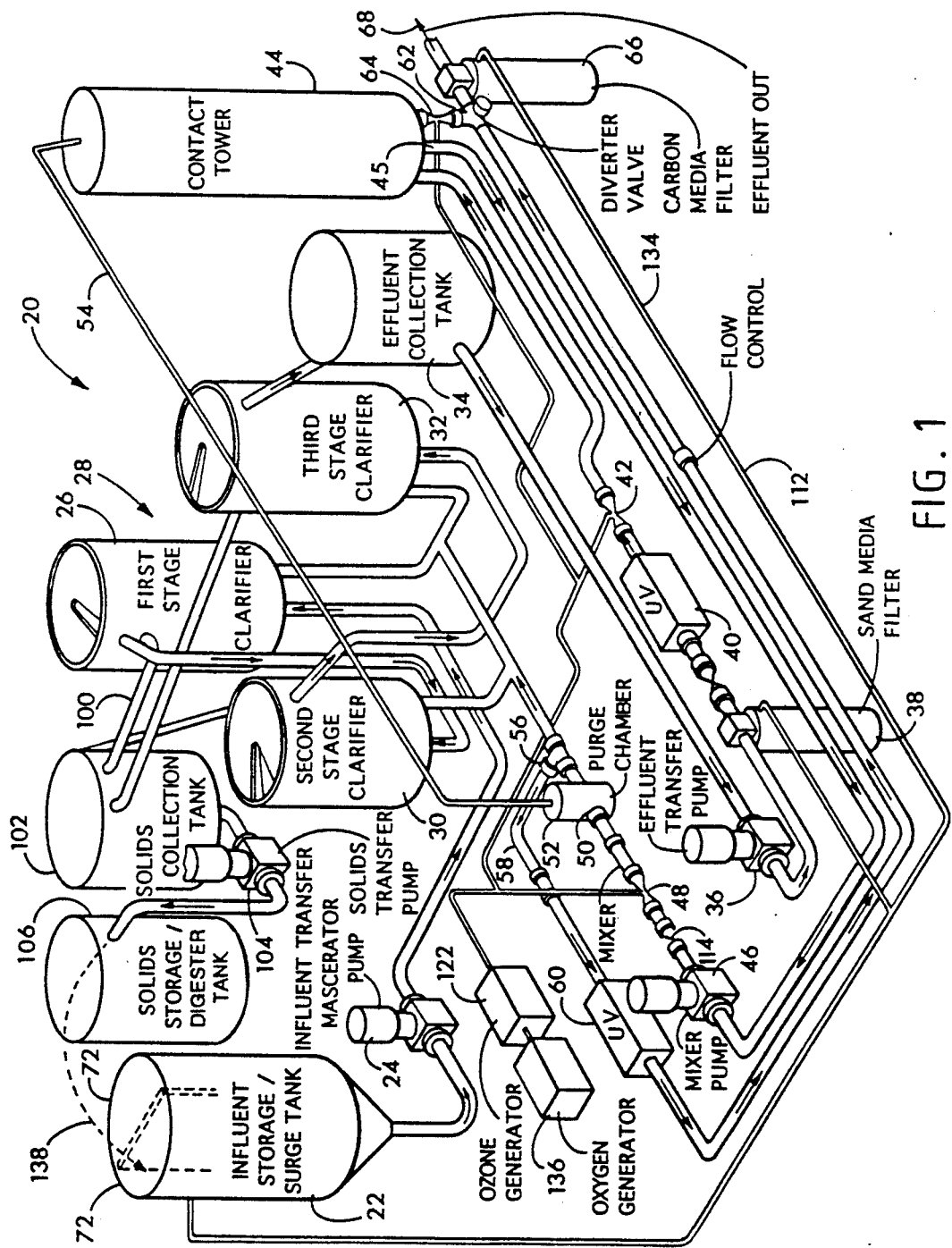
FIG. 1 is a schematic view of the wastewater treatment system with ultraviolet radiation-enhanced ozone of this invention.

Referring more particularly to FIGS. 1-5, wherein like numbers refer to similar parts, a wastewater treatment system 20 is shown schematically in FIG. 1.

Wastewater to be treated is received within an influent storage/surge tank 22 and is transferred by an influent transfer/mascerator pump 24 to the first stage clarifier 26 of the clarifier assembly 28 where ozonated influent is injected into the wastewater and solids are separated therefrom. The liquid effluent from the first stage clarifier 26 passes to the second stage clarifier 30 where further solid removal takes place and the liquid effluent again travels to a third stage clarifier 32 for final skimming of solids with the effluent emptying to an effluent collection tank 34. The effluent is transferred from the collection tank 34 by an effluent transfer pump 36 through a sand media filter 38. The filtered effluent is next irradiated by the ultraviolet light 40, ozone is injected into the stream at the injector 42 and the effluent is distributed within the contact tower 44.

A portion of the effluent within the contact tower is drawn out by the mixer pump 46 through the recirculation line 45. Ozone is injected into the pump effluent at the injector 48 and the ozonated liquid passes through a perforated plate mixer 50 into the purge chamber 52 where non-emulsified gases are channeled to the contact tower 44 by the gas line 54. The liquid which leaves the purge chamber 52 splits at the tee fitting 56 with a fraction being injected into the clarifier assembly 28 and the remaining fraction returning to the contact tower 44 through the return line 58. An ultraviolet light 60 is located in the return line 58 and exposes the fluid to ultraviolet radiation prior to the re-entry of the fluid into the contact tower at the diverter valve 62. Ozone is injected into the fluid at the injector 64 after the diverter valve 62.

The above cycle is repeated until the suspended solids and other undesirable contaminants have been reduced to a required level, at which time the diverter valve 62 is actuated by an electronic controller 65 (shown in FIG. 2) connected to the return line 58 to a carbon media filter 66 and hence to a effluent discharge outlet 68.

Figure 2:
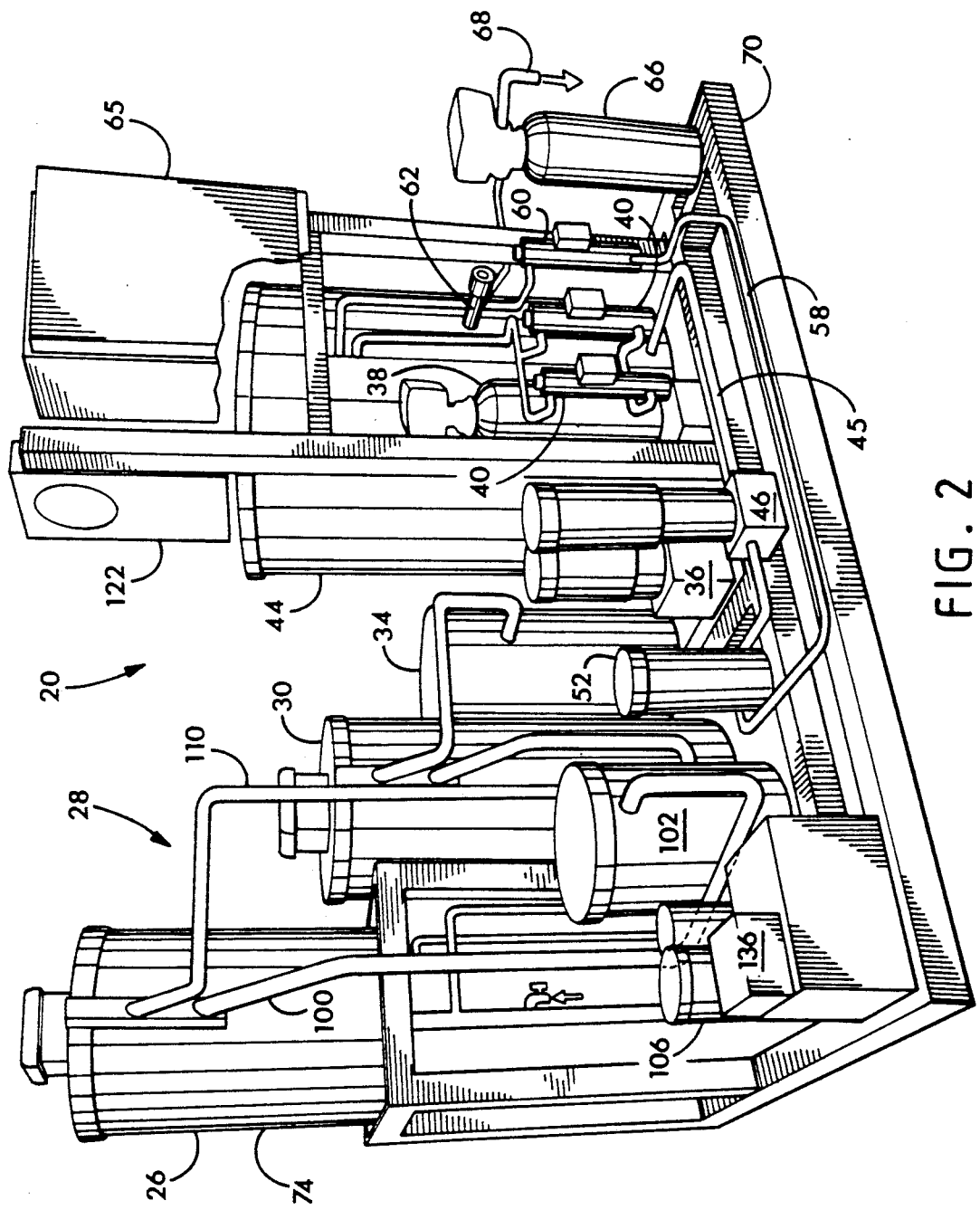
FIG. 2 is a perspective view of the wastewater treatment system of FIG. 1 having a two-level clarifier and being compactly mounted on a transportable skid.
Figure 3:
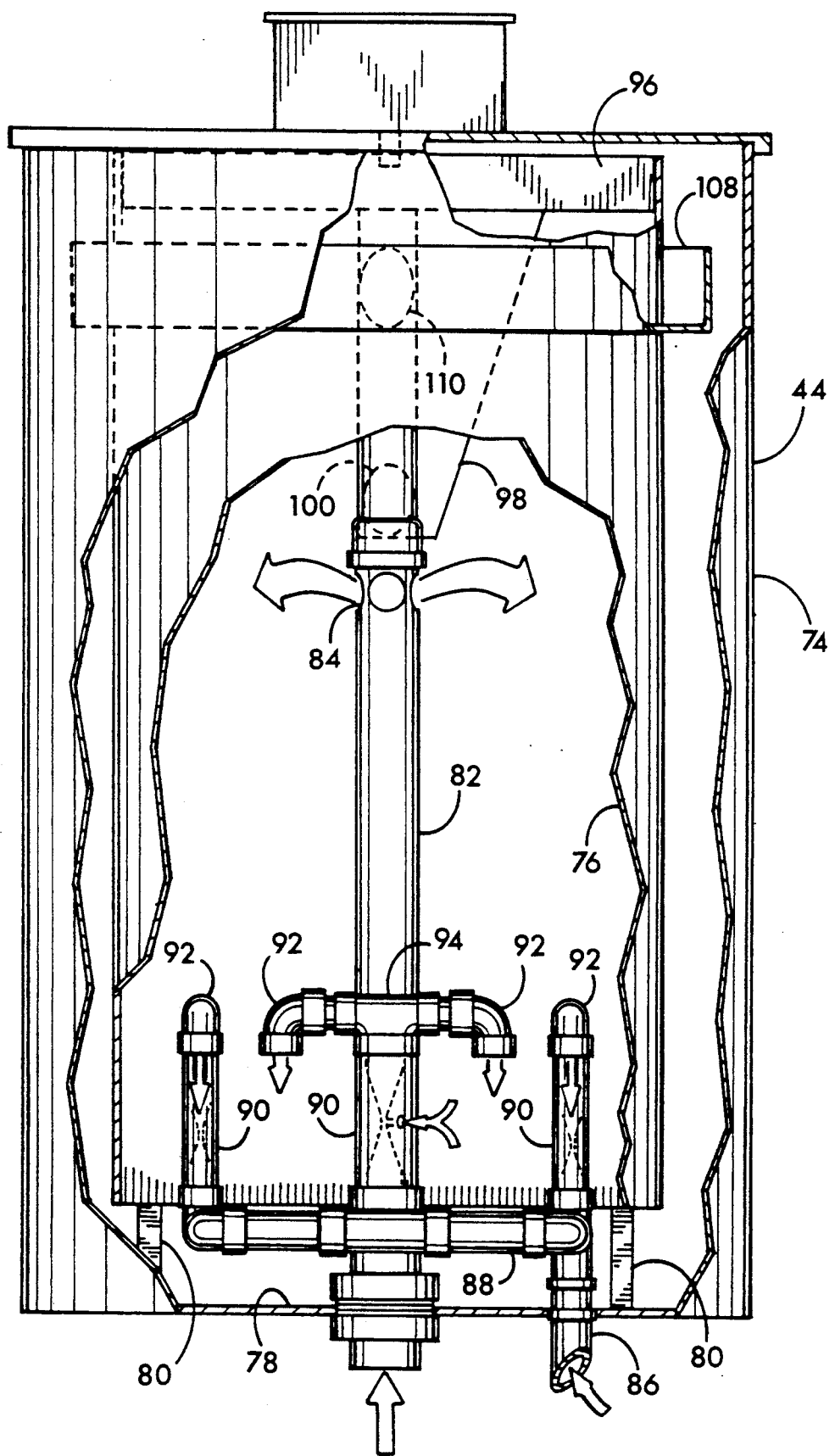
FIG. 3 is a front elevational view, partly broken away, of a clarifier tank of the system of FIG. 2.
Figure 4:
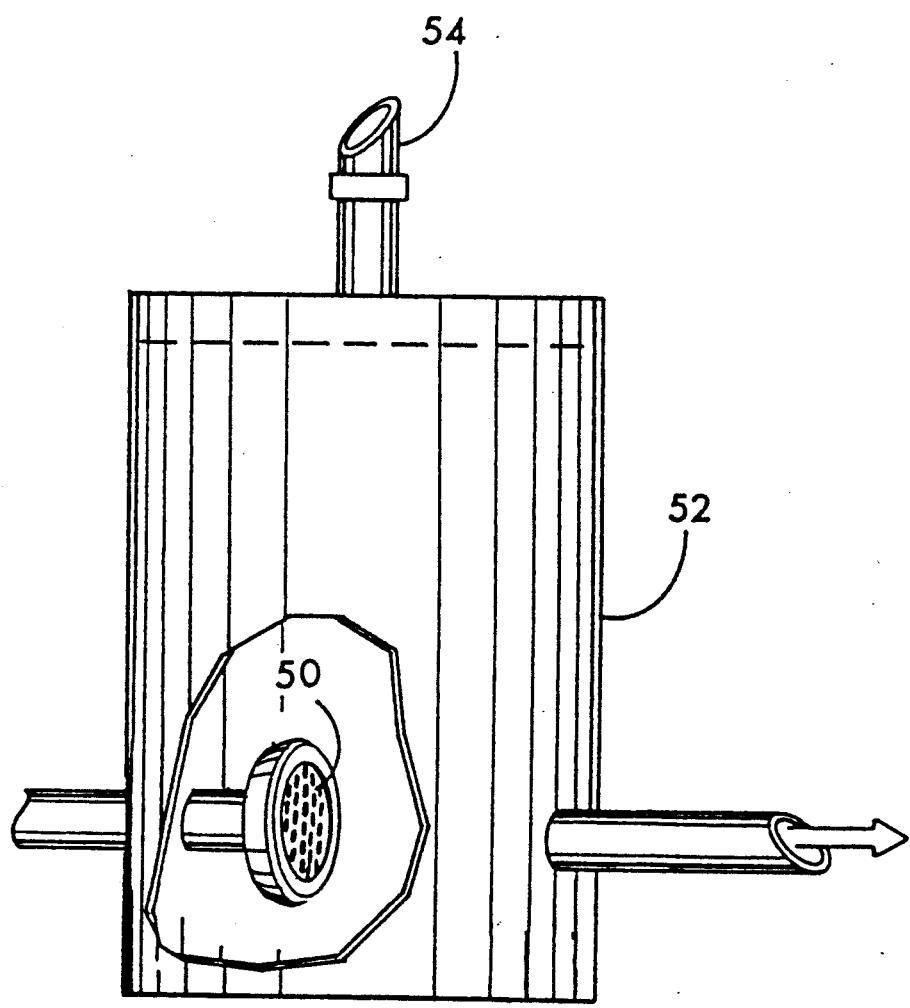
FIG. 4 is a front elevational view, partly broken away, of a gas purge chamber of the water treatment system of FIG. 2.
Figure 5:
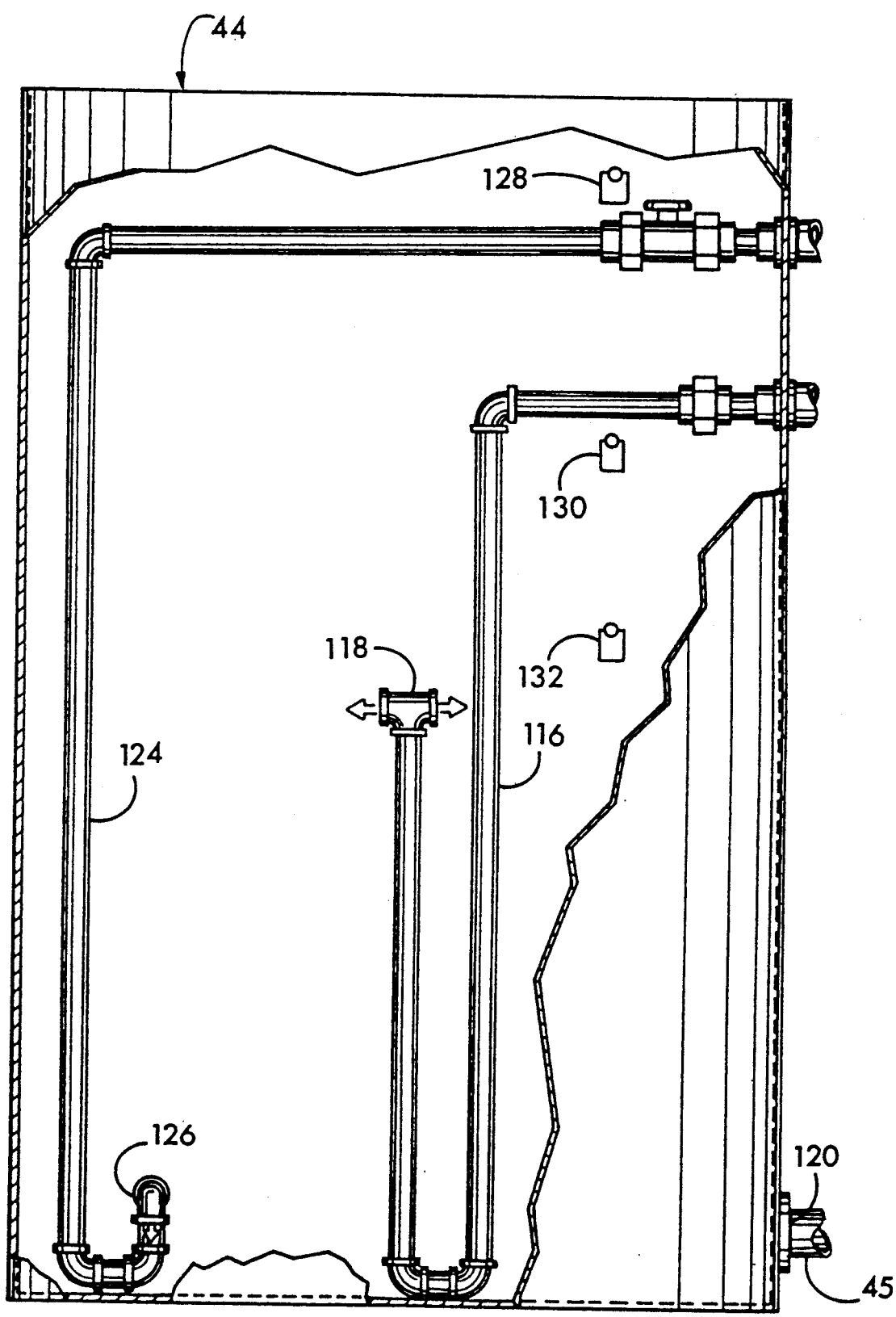
FIG. 5 is a front elevational view, partly broken away, of a contact tower of the water treatment system of FIG. 2.

Although the wastewater treatment system 20 may be constructed to accommodate various rates of wastewater flow, an exemplary one-gallon per minute system 20 is sufficiently compact that most of the components may be mounted to a rigid skid 70, shown in FIG. 2, for transport within a van or truck. The influent storage/surge tank 22 and influent transmitter/mascerator pump 24 will typically be located separately from the skid-mounted components of the wastewater treatment system 20. The influent storage/surge tank 22 is sufficiently large to accommodate the expected flows of wastewater as well as any intermittent wastewater discharges above the capacity of the system 20. The tank 22 may be located above or below ground and for domestic applications where required by local regulations, may be divided into two compartments 72, with one of the compartments serving as an overflow receptacle for solid wastes collected in the clarifier assembly 28. Depending on the application, influent may be pumped in batches continuously into the system 20.

The transfer/mascerator pump 24 breaks up solids within the influent wastewater and pumps the solids-laden influent to the first stage clarifier 26 of the clarifier assembly 28.

The first stage clarifier 26 has a polyethylene tank 74 with a cylindrical stainless steel inner chamber 76 which is supported above the tank base 78 by legs 80. The wastewater with suspended solids enters the inner chamber 76 of the tank 74 through an inlet pipe 82 with discharge openings 84 located approximately two thirds of the tank height from the tank base 78.

Ozonated liquid from the purge chamber 52 is introduced into the lower portion of the inner chamber 76 through the influent pipe 86. The highly oxygenated, ozonated, influent is distributed by an influent manifold 88 connected to the influent pipe 86 to three injectors 90. As the influent flows upwardly through the injectors 90, liquid within the tank 74 is drawn into the injectors 90 and thoroughly mixed with the influent and distributed downwardly through a pair of elbow fittings 92 attached to the top of each injector by a tee fitting 94. A great quantity of fine, highly oxygenated bubbles are produced within the tank 74. A multitude of bubbles is created ranging in size from less than one micron to five microns. The solution will take on a milk white appearance with D.O. (disolved oxygen) levels, at atmospheric pressure, of 120 to 140 percent saturation. Suspended solids are lifted to the top of the inner chamber 76 by dissolved air flotation. Approximately 80 percent of fats, oils, greases and suspended matter may be removed in the first stage clarifier 26. Solids which are floated to the water surface are skimmed from the surface by a rotating skimmer paddle 96 which deposits the skimmed solids into a solids discharge chute 98. The paddle travels at an average velocity of approximately two feet per minute. A solids discharge line 100 carries the collected solids from the solids discharge chute 98 to the solids collection tank 102. The solids collection tank 102 is provided with a high level sensor (not shown) which instructs the controller to activate the solids transfer pump 104 to transfer the solids into the solids storage/digester tank 106 when levels in the solids collection tank 102 become excessively high, or, in systems in which the influent tank is not divided into two compartments, to shut down the system and signal for a human operator.

The fluid from which the solids have been removed is collected within the clarifier tank 74 by an annular trough 108 which extends from the inner chamber cylinder 76. The collected effluent travels through the effluent discharge 110 and is channeled to the inlet pipe of the second stage clarifier 30. The second and third stage clarifiers are substantially identical in construction to the first stage clarifier. Each clarifier receives wastewater from the previous stage through its inlet pipe and receives freshly ozonated liquid through its influent pipe from the purge chamber 52. The solids collected at each stage are all channeled to the solids collection tank 102.

The ratio of influent wastewater to influent ozonated fluid is approximately one-to-one. The dimensions of the clarifier tank may be varied to achieve a desired retention. An exemplary tank has a retention time of approximately 37 minutes.

As most of the solids have been removed from the wastewater by the time it reaches the second stage clarifier, the ozone, which presents a large reactive surface area due to the extremely small size of the bubbles, begins to react with the contaminants in the wastewater to reduce BOD and Chemical Oxygen Demand (COD) levels.

In most applications, substantially all solids will have been removed from the effluent from the second stage clarifier 30, hence a third clarifier stage 32 will not be needed, as in the system 20 shown in FIG. 2. However, where desirable, a third stage clarifier 32 may be provided. This third stage clarifier 32 does polishing of the wastewater, removing a final amount of solids. The effluent from the final stage clarifier is directed to the effluent collection tank 34. The effluent transfer pump 36 pumps the clarified wastewater from the effluent collection tank 34 through a filter 38, preferably a sand media filter. The filter 38 removes any remaining small amounts of solids within the wastewater. The sand media filter 38 is an automatic back-flushing, self-cleaning filter. Once the filter bed has been loaded with filter material, freshwater may be run through the system 20 and the filter back-flushed through the back-flush line 112 to the influent storage tank 22 for reprocessing through the system 20. A check valve 114 is positioned between the sand media filter 38 and the ultraviolet light 40 to prevent back flow through the filter.

Ultraviolet radiation has conventionally been employed in wastewater treatment systems to attack bacterial impurities and treated water as a step in the process prior to discharge of the treated water. In marked distinction to such prior art systems, the wastewater system 20 of the present invention utilizes ultraviolet light sources 40, 60 which are placed so as to repeatedly irradiate recirculating ozonated liquid.

It has been observed that in the present invention ultraviolet treatment of water containing quantities of ozone, while reducing bacterial contamination, more importantly enhances the efficacy of the ozone within the wastewater to boost the reactive properties of the ozone to increased levels of performance. The ultraviolet treatment creates OH radicals which act as catalysts to the ozone reaction to greatly facilite reactions within the fluid.

To fully take advantage of this characteristic of combined ultraviolet radiation and ozone injection, the process of the present invention recirculates extensively the UV treated liquids, rather than immediately discharging them. The increased performance is significant and allows for reduced quantities of injected ozone for fixed performance levels.

Conventional ultraviolet radiation sources may be employed, for example Model CRF3A OEM, manufactured by Cleanwater Systems, of Klamath Falls, Ore., or units supplied by Ultra Dynamics Corp of Santa Monica, Calif.

Once the filtered fluid has been exposed to ultraviolet radiation in the UV light source 40, additional ozone is added to the fluid at the injector 42. The injected ozone works with the OH radicals created by the ultraviolet irradiation to promote reactions with contaminants. After ozone injection, the fluid is transferred to the contact tower 44, best shown in FIG. 5. The fluid enters the contact tower through a distributor pipe 116 and is ejected at a point approximately one half way up the contact tower through a tee-fitting 118. If additional mixing of the fluid within the contact tower is desired, an injector may be placed along the distributor pipe 116 prior to the tee-fitting 118. The fluid, from which substantially all solids have been removed, remains within the contact tower for a preset period of time, controlled by the electronic controller 65, to allow for complete reaction of the ozone with undesirable contaminants. The retention time, which may vary from zero to three hours, will generally be far in excess of the half life of ozone (approximately 10 minutes). To maintain reactive amounts of ozone within the contact tower 44, a portion of the fluid within the contact tower is continuously recirculated through the system to receive additional injections of ozone together with ultraviolet radiation enhancement.

Fluid to be recirculated is drawn from the base of the contact tower 44 through the drain 120. The recirculating fluid is pumped from the contact tower 44 through the recirculation line 45 by the mixer pump 46. The mixer pump 46 delivers the fluid to the injector 48 at approximately 85 to 95 psi. As the fluid flows through the injector it is converted to a high velocity stream which draws ozone from the ozone generator 122 which is entrained within the stream of fluid. The mixing action of the injector 42 creates a highly oxygenated, ozonated, emulsified solution which exits through the mixer 50 into the purge chamber 52, best shown in FIG. 4.

The mixer 50 is a circular plate having a plurality of circular holes formed therein, the holes constituting approximately 50% of the surface of the mixer 50. The fluid passing through the mixer 50 and into the unpressurized purge chamber 52 undergoes a sudden decrease in velocity which allows the non-emulsified gases to rise from the fluid and be vented through the gas line 54 into the contact tower 44. The mixer 50 provides for an advantageous additional mixing of the ozone with the liquid with low back pressure.

The injector 48, the mixer 50, and the purge chamber 52 create a highly emulsified fluid having a multitude of extremely small ozone bubbles on the order of one micron in diameter. A fraction of this emulsified solution passes through the tee-fitting 56 into the clarifier assembly 28 to float suspended solids from the influent wastewater. The remainder of the highly ozonated liquid is carried by the return line 58 to the ultraviolet light source 60 where the reactive properties of the ozone are enhanced by exposure to ultraviolet radiation and then through the diverter valve 62 which is retained in the recirculation position by the electronic controller. From the diverter, the fluid flows through the injector 64 which draws additional ozone into the flow and finally is reintroduced into the contact tower 44 through the recirculation distributor pipe 124. The recirculation distributor pipe 124 has a tee-fitting terminating in two downwardly directed elbows 126 through which the recirculated fluid is discharged.

The fluid within the contact tower is thus continuously recharged with ultraviolet-irradiated ozonated fluid.

After a predetermined time, the fluid, which has been recirculating through the contact tower 44, will have sufficiently reacted with the ozone to have obtained desirable levels of BOD and COD. Depending on the retention time, the liquid may have been recirculated as much as 100 times through the system 20 before time for discharge. At that time the diverter valve 62 is actuated by the electronic controller 65 to block return of fluid through the fluid line 58 into the contact tower 44 and to divert that fluid to the carbon media filter 66. The carbon filter 66 acts to remove excess ozone and any minute amounts of remaining contaminants and gases from the final effluent. The effluent leaves the carbon media filter 66 and is discharged through the outlet 68 into a drainage bed or other disposal means (not shown). The final effluent should meet all waste disposal criteria such that it may safely be used as irrigation water.

Three float switches 128, 130, 132 are vertically spaced within the contact tower 44 and are electrically connected to the electronic controller to serve as water level sensors. When the controller detects that the contact tower water level has fallen to the level of the lowest float switch 132, the diverter valve 62 is actuated to halt discharge of treated wastewater and to restore the flow of recirculating liquid to the contact tower 44.

The carbon media filter 66 is connected to a back-flush line 134 which is connected to the influent storage tank 22. The carbon media filter 66 may be periodically back-flushed with discharged fluid from the return line 58 through the back-flush line 134 to clear the filter of accumulated contaminants.

Ozone is supplied to the system 20 through the injectors 42, 48, 64 by a conventional ozone generator 122, such as those manufactured by $O_3$ Associates and distributed by Ozone Engineering Co. of Pleasanton, Calif., which employs a double plate dialectric apparatus for ozone generation. For a one gallon per minute capacity system, the ozone generator 122 should have an ozone generation capacity of approximately one pound per day. To provide oxygen to the ozone generator 122 for efficient production of ozone, an oxygen generator 136 is connected to the ozone generator 122.

Over a period of time, solids removed from the influent will accumulate within the solids collection tank 102. Tests have indicated that for every one thousand gallons treated a maximum of approximately two gallons of solids are collected. The solids collection tank 102 is provided with a high level sensor (not shown) which activates the solids transfer pump 104 when the solids reach a predetermined level within the collection tank. The solids transfer pump 104 pumps the solids into the storage digestor tank 106. When a sufficient quantity of solids have transferred into the tank aerobic bacteria and enzymes may be introduced to promote digestion of the solids.

The effluent collection tank 34 is also preferably outfitted with a high level sensor to allow the system to be shut down should levels within the tank become excessive.

In domestic systems, a solids overflow line 138 extends from the solids storage/digester tank 106 to the influent storage/surge tank 22. Should the level of solids exceed the capacity of the solids storage tank 106, the excess solids may flow to the influent storage tank 22.

The wastewater treatment system 20 may be effectively employed to treat wastewater containing a wide variety of wastes including, but not limited to grease, petroleum products, pesticides, and other undesirable contaminants.

A compact wastewater treatment system 20 such as shown in FIG. 2, may be conveniently transported to the site of a particular wastewater contamination, for example a zone of groundwater contamination. Wastewater to be treated may then be processed through the system 20 on site until the undesirable contaminants have been removed at which point the system may be transported to another contaminated site. This system 20 may also be permanently installed for treatment of continuous supplies of contaminated wastewater such as those produced by rural dwellers, farm businesses and manufacturing facilities.

It should be noted that where a single ultraviolet radiation source or a single injector for ozone is illustrated in the preferred embodiment, multiple UV sources or injectors may be employed in larger capacity installations. Furthermore, depending on the wastewater to be treated, one, two or more stage clarifiers may be employed. The piping and tanks of the system will preferably be formed of stainless steel or nonreactive plastic due to the highly reactive nature of the ozonated fluid carried within.

It is understood that the invention is not confined to the particular construction and arrangement of parts herein illustrated and described, but embraces such modified forms thereof as come within the scope of the following claims.

I claim:

1. An apparatus for removal of contaminants from water, comprising:
   a) a source of contaminated water for treatment;
   b) a source of ozone;
   c) a contact tower for residence therein of water undergoing treatment;
   d) a purge chamber which receives liquid from the contact tower;
   e) a first recirculation fluid line which carries fluid from the contact tower to the purge chamber;
   f) an injector located in the first recirculation line and connected to the ozone source to introduce ozone into the purge chamber effluent liquid;
   g) at least one clarifier tank; a connecting line which directs effluent from the purge chamber to the clarifier tank;
   h) an influent line connecting the contaminated water source to the clarifier, wherein the contaminated water discharges into the clarifier and contaminated water intermingles with the ozonated effluent therein, the effluent of the clarifier being directed into the contact tower;
   i) a bypass fitting installed in the connecting line between the purge chamber and the clarifier;
   j) a return line extending from the bypass fitting and connecting the connecting line to the contact power, the bypass fitting acting to divert a portion of the purge chamber effluent through the return line to the contact tower;
   k) a second recirculation line connecting the clarifier and the contact tower;
   l) an ultraviolet radiation source disposed in the second recirculation line between the clarifier and the contact tower so as to irradiate all the liquid which passes into the contact tower from the clarifier;
   m) a discharge line connected to the return line; and
   n) a diverter valve located in the return line to permit purge chamber effluent contained in the return line to be selectively directed to the contact tower or discharged through the discharge line from the apparatus as treated effluent from which unacceptable levels of contaminants have been removed.

2. The apparatus of claim 1 further comprising a second injector disposed in the second recirculation line between the ultraviolet radiation source and the contact tower and connected to the ozone source to inject ozone into the liquid which leaves the ultraviolet radiation source.

3. The apparatus of claim 1 further comprising a second ultraviolet radiation source installed in the return line so as to irradiate the portion of the purge chamber effluent diverted through the return line.

4. The apparatus of claim 1 further comprising a second ozone injector disposed in the return line and connected to the ozone source for injection of ozone into the effluent from the return line which enters the contact tower.

5. The apparatus of claim 1 further comprising a sand filter disposed in the second recirculating line and which receives the effluent from the clarifier, wherein the filter is upstream of the ultraviolet radiation source.

6. The apparatus of claim 5 further comprising a back-flush line extending from the sand filter to the source of contaminated water, the back-flush line being adapted to recirculate water contaminated as a result of back-flushing the sand filter.

7. The apparatus of claim 1 further comprising a carbon filter disposed in the discharge line which filters treated water prior to its discharge from the apparatus.

8. The apparatus of claim 1 further comprising a gas line extending from the purge chamber to the contact tower, the gas line being adapted to divert non-emulsified gases from the purge chamber to the contact tower.

9. The apparatus of claim 1 further comprising a second clarifier tank connected to receive the effluent from the first clarifier tank and connected to receive a portion of the effluent from the purge chamber for mixing and additional solids removal, wherein the second recirculation line connects the second clarifier tank to the contact tower.

10. The apparatus of claim 1 further comprising at least one injector disposed at the end of the connecting line and located within the clarifier tank below the liquid level within the tank to draw the liquid already contained within the clarifier tank through the injector and back into the clarifier tank.

11. The apparatus of claim 1 further comprising a transportable rigid skid upon which the apparatus is mounted to facilitate transport of the apparatus.

12. The apparatus of claim 1 further comprising an oxygen generator connected to supply oxygen to the ozone source.

13. An apparatus for the removal of contaminants from wastewater comprising:
   a) an influent storage tank, adapted to contain wastewater for treatment;
   b) at least one clarifier tank having an influent distributor connected to the influent storage tank and adapted to discharge wastewater within the clarifier tank for interaction with ozonated liquid and the flotation of solids from the wastewater for removal from the wastewater;
   c) a contact tower having an effluent distributor connected by a connecting line to the clarifier tank, the contact tower receiving liquid effluent discharged from the clarifier tank, the contact tower distributor discharging the received liquid within the contact tower;
   d) an ultraviolet radiation source disposed in the connecting line connecting the clarifier to the contact tower to irradiate all the liquid which passes into the contact tower from the clarifier tank;
   e) a recirculation line extending from the contact tower back to the clarifier tank;
   f) a source of ozone connected to an injector disposed in the recirculation line which supplies ozone to the fluid carried within the recirculation line to provide ozonated fluid to the clarifier tank;
   g) a return line connecting the recirculation line to the contact tower which carries a portion of the ozonated liquid from the recirculation line;
   h) a valve located in the return line; and
   i) a discharge line extending from the valve, wherein the valve is operable to selectively return the fluid carried therein to the contact tower or to discharge the fluid from the system as treated fluid from which undesirable levels of contaminants have been removed.

14. The apparatus of claim 13 further comprising an electronic controller connected to the valve and adapted to cause treated fluid to discharge from the apparatus after a selected time period.

15. The apparatus of claim 13 further comprising a second injector disposed in the recirculation line between the ultraviolet radiation source and the contact tower and connected to the ozone source to inject ozone into the liquid which leaves the ultraviolet radiation source.

16. The apparatus of claim 13 further comprising a second ultraviolet radiation source installed in the return line so as to irradiate the portion of the fluid diverted through the return line.

17. The apparatus of claim 13 further comprising a second ozone injector located in the return line and connected to the ozone source for injection of ozone into the effluent from the return line which enters the contact tower.

18. The apparatus of claim 13 further comprising a sand filter disposed in the recirculation line which receives the effluent from the clarifier, wherein the ultraviolet radiation source is disposed downstream of the filter.

19. The apparatus of claim 18 further comprising a back-flush line extending from the sand filter to the influent storage tank, the back-flush line being adapted to recirculate water contaminated as a result of back-flushing the sand filter.

20. The apparatus of claim 13 further comprising a carbon filter disposed in the discharge line which filters treated water prior to its discharge from the apparatus.

21. The apparatus of claim 13 further comprising a gas line extending from the purge chamber to the contact tower, the gas line being adapted to divert non-emulsified gases from the purge chamber to the contact tower.

22. The apparatus of claim 13 further comprising a second clarifier tank connected to receive the effluent from the first clarifier tank and connected to receive a portion of the effluent from the recirculation line for mixing and additional solids removal, wherein the recirculation line connects the second clarifier to the contact tower.

23. The apparatus of claim 13 further comprising at least one injector disposed at the end of the connecting line and located within the clarifier tank below the liquid level within the tank to draw the liquid already contained within the clarifier tank through the injector and back into the clarifier tank.

24. The apparatus of claim 13 further comprising a transportable rigid skid upon which the apparatus is mounted to facilitate transport of the apparatus.

25. The apparatus of claim 13 further comprising an oxygen generator connected to supply oxygen to the ozone source.

* * * * *